(12) United States Patent
Jin et al.

(10) Patent No.: US 6,904,266 B1
(45) Date of Patent: Jun. 7, 2005

(54) WIRELESS ENHANCER USING A SWITCH MATRIX

(75) Inventors: Hang Jin, Plano, TX (US); Guanghan Xu, Garland, TX (US); Xinguang Xu, Plano, TX (US)

(73) Assignee: Navini Networks, Inc., Richardson, TX (US)

( * ) Notice: Subject to any disclaimer, the term of this patent is extended or adjusted under 35 U.S.C. 154(b) by 446 days.

(21) Appl. No.: 10/078,635

(22) Filed: Feb. 19, 2002

(51) Int. Cl.[7] .................................................. H04B 7/14
(52) U.S. Cl. ............................. 455/20; 455/17; 455/25; 455/277.1; 370/293; 370/279; 370/282
(58) Field of Search ............................... 455/20, 277.1, 455/9, 15, 17, 21, 22, 25; 370/293, 294, 279, 280, 282

(56) References Cited

U.S. PATENT DOCUMENTS

| | | | | |
|---|---|---|---|---|
| 5,060,293 A | * | 10/1991 | Kok et al. | 455/78 |
| 5,377,255 A | * | 12/1994 | Beasley | 370/279 |
| 5,603,080 A | | 2/1997 | Källander et al. | |
| 5,634,191 A | * | 5/1997 | Beasley | 370/279 |
| 5,726,980 A | * | 3/1998 | Rickard | 370/293 |
| 5,835,848 A | | 11/1998 | Bi et al. | |
| 5,903,592 A | * | 5/1999 | Itaya | 375/130 |
| 6,108,364 A | * | 8/2000 | Weaver et al. | 375/130 |
| 6,115,369 A | | 9/2000 | Oura | |

* cited by examiner

Primary Examiner—Edward F. Urban
Assistant Examiner—Blane J. Jackson
(74) Attorney, Agent, or Firm—Preston Gates & Ellis LLP (57) ABSTRACT

An improved enhancer is disclosed which uses a switch matrix to increase the isolation between two antennas. For either an reverse link or forward link communication, the enhancer has a first antenna for receiving an incoming signal, and a receiver sub-system that amplifies and converts the incoming signal from the first antenna to a first predetermined frequency band. The enhancer further has a demodulator coupled to the receiver sub-system for demodulating the converted signal, and detecting timing information thereof. Also contained in the enhancer is a transmitter sub-system operable with the receiver sub-system that converts the signal from the receiver subsystem to a second predetermined frequency band and further amplifies the signal. After the signal is thus enhanced, a second antenna is used for further transmitting the amplified signal from the transmitted sub-system. The switch matrix controls connection switching among the first antenna, the second antenna, the transmitter sub-system, and the receiver sub-system, wherein the connection switching of the switch matrix is made based on the timing information detected by the demodulator and based on whether the incoming signal comes from a terminal or a base transceiver station.

45 Claims, 9 Drawing Sheets

WIRELESS ENHANCER USING A SWITCH MATRIX

BACKGROUND OF THE INVENTION

The present disclosure relates generally to communication radio hardware and software, and more particularly, to the repeater or enhancer used in wireless communication systems.

A repeater or enhancer is a radio apparatus that is used in wireless communication systems to boost or enhance radio signal strength in order to extend the radio coverage. An enhancer typically includes a donor antenna, a service antenna, and an electronic circuit that performs signal reception, amplification, and re-transmission. For the forward link (or down link) communications from a base transceiver station (BTS) to a terminal such as a mobile station, an enhancer receives a signal from the BTS through the donor antenna, enhances and re-transmits the signal to the intended terminals with the service antenna. Similarly for the reverse link (or up link) communications from the terminal to the BTS, the enhancer receives a signal from the terminal through the service antenna, enhances and re-transmits it to the BTS using the donor antenna. As such, the enhancer merely stands in a radio path between the BTS and the terminals, and receives and transmits the radio signals at the same time.

It is understood that typically the transmitted signal level is much higher than the received signal level. Since the enhancer receives and transmits signals at the same time, an effective isolation mechanism is required between the donor and service antennas. Furthermore, if the BTS and terminals employ time division duplex technology (TDD) for both the forward and reverse link communications, the enhancer needs to know the exact timing for the TDD switching in order to implement a mechanism to connect the donor antenna to an input port of the corresponding receiver circuit, and similarly, the service antenna to an output port of the transmitter circuit during the forward link communications. Likewise, the TDD switch timing helps to appropriately connect the service antenna to the input port of the receiver circuit and the donor antenna to the output port of the transmitter circuit during the reverse link communications.

In the conventional art, several methods for improving the isolation mechanism of a enhancer have been proposed. For example, Qi Bi et al (U.S. Pat. No. 5,835,848) discloses a method using a feedback signal whose amplitude and phase are adjusted in response to the amplitude and phase of a sampled input signal when the normal output of the enhancer is turned off for a short period of time so the sampled input is the leakage signal. The information extracted is then used in the normal operation to cancel out the leakage. This method can be classified as an active noise cancellation method and needs sophisticated hardware and software implemented in the enhancer.

In another example, Hideto Oura (U.S. Pat. No. 6,115,369) discloses another method where the transmission and receiver times are allocated at different time slots. This method is classified as a store-then-transmit method. Its drawback is that the enhancer will not be transparent to the BTS and terminals, and the data throughputs between the BTS and terminals are reduced at least by half.

Stefan Kallander et al (U.S. Pat. No. 5,603,080) discloses a method where a high radio frequency used between the BTS and enhancer is first converted at a first converter into a low frequency, which is capable to transmit over cable to a second converter where the low frequency signal is converted into the high radio frequency, which is then transmitted to the terminals. This method requires two converters that locate separately and a transmission media between them.

What is needed is an efficient method for determining the TDD switch timing and an improved method and system that provides more signal isolation between the donor and service antennas to avoid oscillation.

SUMMARY OF THE INVENTION

This disclosure provides an improved enhancer, which uses a switch matrix to increase the isolation between two antennas. For either a forward or reverse communication, the enhancer has a first antenna for receiving an incoming signal, and a receiver sub-system that amplifies and converts the incoming signal from the first antenna to a first predetermined frequency band. The enhancer further has a demodulator coupled to the receiver sub-system for demodulating the converted signal, and detecting timing information thereof. Also contained in the enhancer is a transmitter sub-system operable with the receiver subsystem that converts the signal from the receiver sub-system to a second predetermined frequency band and further amplifies the signal. After the signal is thus enhanced, a second antenna is used for further transmitting the amplified signal from the transmitted sub-system. The switch matrix controls connection switching among the first antenna, the second antenna, the transmitter sub-system, and the receiver sub-system based on the timing information detected by the demodulator and based on whether the incoming signal comes from a terminal or a base transceiver station (BTS).

In another example of the present disclosure, the switch matrix is further enhanced by including four controlled amplifiers to attenuate signal leakage from the switches of the switch matrix. The controlled amplifier can be a low noise amplifier, a power amplifier, or even a double pole single throw switch.

In another example of the present disclosure, a synthesizer is used to produce local oscillator frequencies for use by the receiver sub-system and the transmitter sub-system. The synthesizer can also be enhanced by including several pairs of switches and amplifiers arranged in such a way to further isolate local oscillator frequencies generated by the synthesizer.

One example of the enhancer disclosed is an enhancer using time division duplex technology, and contains a donor antenna and a service antenna. The donor antenna is designed to be a patch antenna facing the BTS direction, while the service antenna can be a dipole antenna lying on the same plane as the patch antenna. Both the patch and dipole antennas have a null point in their radiation patterns along the vertical direction so that such an arrangement will maximize their mutual isolation.

DESCRIPTION OF THE PREFERRED EMBODIMENT

Figure 1:
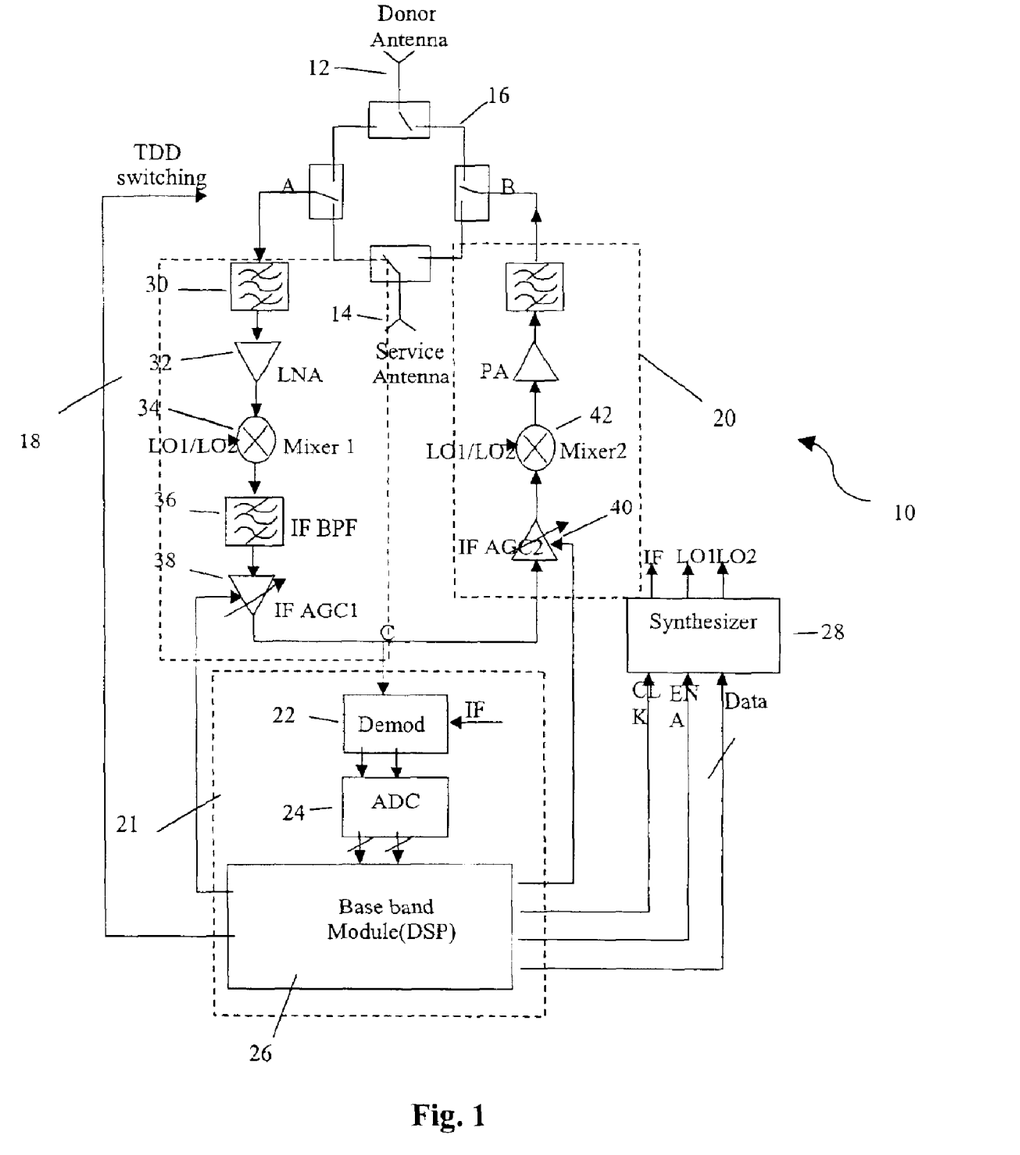
FIG. 1 illustrates a schematic of an enhancer according to one example of the present disclosure.

FIG. 1 illustrates a schematic of an enhancer 10 according to one example of the present disclosure. The components of the enhancer includes a donor antenna 12, a service antenna 14, a switch matrix 16, a receiver sub-system 18, a transmitter sub-system 20, a demodulator subsystem 21 which contains a demodulator 22, an analog-to-digital converter (ADC) 24, and a base band module (DSP) 26, and a synthesizer sub-system 28. The switch matrix 16 is controlled by switch signals that are derived from the TDD switch timing information provided by the DSP 26. Essentially, the switch matrix 16 makes appropriate connection arrangements for forward and reverse link communications to "switch in" corresponding either the donor antenna or the service antenna on one hand, and the receiver sub-system or the transmitter sub-system on the other hand. For example, Table 1 illustrates the expected connections for the input port A for the receiver sub-system 18 and the output port B for the transmitter sub-system 20.

TABLE 1

| | Switch port connection | |
| --- | --- | --- |
| | Forward link | Reverse link |
| Receiver input port A | Donor Antenna | Service Antenna |
| Transmitter output port B | Service Antenna | Donor Antenna |

Taking a forward link communication session as an example, when the enhancer powers up, the switch matrix 16 connects the donor antenna 12 to the receiver input port (e.g., port A) by default. It is understood that control mechanisms may be implemented to sweep only a carrier frequency band of the entire operating spectrum of the receiver subsystem at a time in order to "lock in" an incoming signal at its best receiving condition. One or more criteria can be set up to decide which carrier frequency band should be selected, and such criteria may include the considerations for the strength of the signal, the signal-to-noise ratio after demodulation by the demodulator sub-system 21, and the traffic loading of the carrier frequency band. When such a carrier frequency band is determined, the donor antenna 12 is tuned to receive the incoming signal at this carrier frequency band. When the receiver sub system 18 receives the incoming signal from the donor antenna 12, the signal goes through a first band pass filter 30 to eliminate other signals that are not in a desired frequency band. The survived signal is further amplified by a low-noise amplifier (LNA) 32 and down converted to an intermediate frequency (IF) through a mixer 34, which provides a locally generated frequency such as LO1 or LO2. The signal is then further filtered by a second filter 36 (e.g., another band pass filter), and further amplified to a desired level by a second amplifier 38 operating at the intermediate frequency (e.g., an adjustable gain amplifier (AGC1)) such that the signal level falls into an acceptable operation range of the demodulator 22 and the ADC 24. It is further understood that the incoming signal is continuously monitored by base band module 26, and if the quality of the received incoming signal is not satisfactory (e.g., the signal-to-noise ratio drops below a threshold value), the enhancer scans another carrier frequency band in order to use a new carrier frequency.

On the transmitter sub-system side, connecting from the output of the AGC1, the signal is first amplified through another adjustable gain amplifier 40 (e.g., AGC2), and up-converted into a radio frequency through another mixer 42 using a locally generated frequency such as the local oscillator frequency LO1 or LO2. Thereafter, the signal is further amplified through a power amplifier (PA) 44 and another band pass filter 46, and eventually sent out to the predetermined terminal through the service antenna. As such, the radio signal from the BTS has been boosted through the enhancer 10, and further sent to the terminal. The synthesizer module 28 provides all the local oscillator frequencies (IF, LO and LO2) needed for the demodulation and signal conversions (e.g., up/down conversions). With the procedure similar to selecting the best receive carrier frequency between BTS and enhancer, the receiver sub-system 18 also continuously scans or sweeps a carrier frequency band of the operating spectrum thereof to find an "ideal" frequency band for transmitting outgoing signals. One consideration for determining such an ideal frequency band is the noise level of such a frequency band. Another consideration is to keep the separation between the carrier frequency band used by the receiver sub-system 18 and the carrier frequency band used by the transmitter sub-system 20 for transmission as far apart as possible. As such, the incoming and outgoing signals are isolated to the maximum, thereby reducing signal oscillation therebetween.

The demodulator sub-system 21 plays a role in determining switching timing information between the reverse link and forward link communication sessions. The demodulator 22 demodulates the IF signal from the output of the receiver sub-system into an analog base band signal, and the ADC 24 further converts the analogue base band signal into a digital signal. The base band module 26 performs a synchronization function, and determines the TDD switch timing information from the digital signal. A searching algorithm is employed in the DSP to search and obtain the TDD switch timing information. The search algorithm may vary depending on communication protocols used with the particular wireless system in which the enhancer is integrated therein. For example, if the protocol used has a dedicated synchronization channel, the starting timing of the TDD forward link can be determined by searching correlation peak with the dedicated synchronization channel. After the synchronization is achieved, the TDD switch timing information can be obtained by demodulating the information contained in the synchronization channel. For example, if the total TDD time frame is fixed, the synchronization channel can contain the information indicating the ratio between the forward and reverse links, from which the starting timing for the reverse link is then derived.

The dedicated synchronization channel can be a virtual channel that may be mapped into a variety of physical channels so long as the mapping mechanism is predefined in the protocol and known to the enhancer. For example, the synchronization channel can be a short period of data burst transmitted before every TDD frame, or one of the co-channels that is transmitted with other traffic channels.

In addition, the BTS carrier frequency can be obtained at the same time during the synchronization. This is done by sweeping the relevant frequency spectrum, and at each frequency point, the base band module searches the correlation peak. It is understood that a correlation peak exists only when the enhancer is tuned to the correct BTS carrier frequency.

With the TDD switch timing information on hand, the switch matrix is fully controlled wherein, during the forward link, the donor antenna is connected to the receiver input port (port A in FIG. 1) and service antenna is connected to the transmitter output port (port B in FIG. 1). On the other hand, during the reverse link, the donor antenna is connected to the transmitter output port and the service antenna is connected to the receiver input port.

As shown in FIG. 1, two mixers/local oscillators (LOs), LO1 and LO2, may be used in the enhancer. This also provides a frequency different from the BTS carrier frequency for the communication link between the enhancer and the terminal.

One benefit of using a different frequency is that the isolation between the enhancer's donor and service antennas can be further improved. For example, if the BTS carrier frequency is f1, one can use f2 (wherein f2 differs from f1) for the link between the enhancer and terminals provided there is sufficient separation between f1 and f2.

Figure 2:
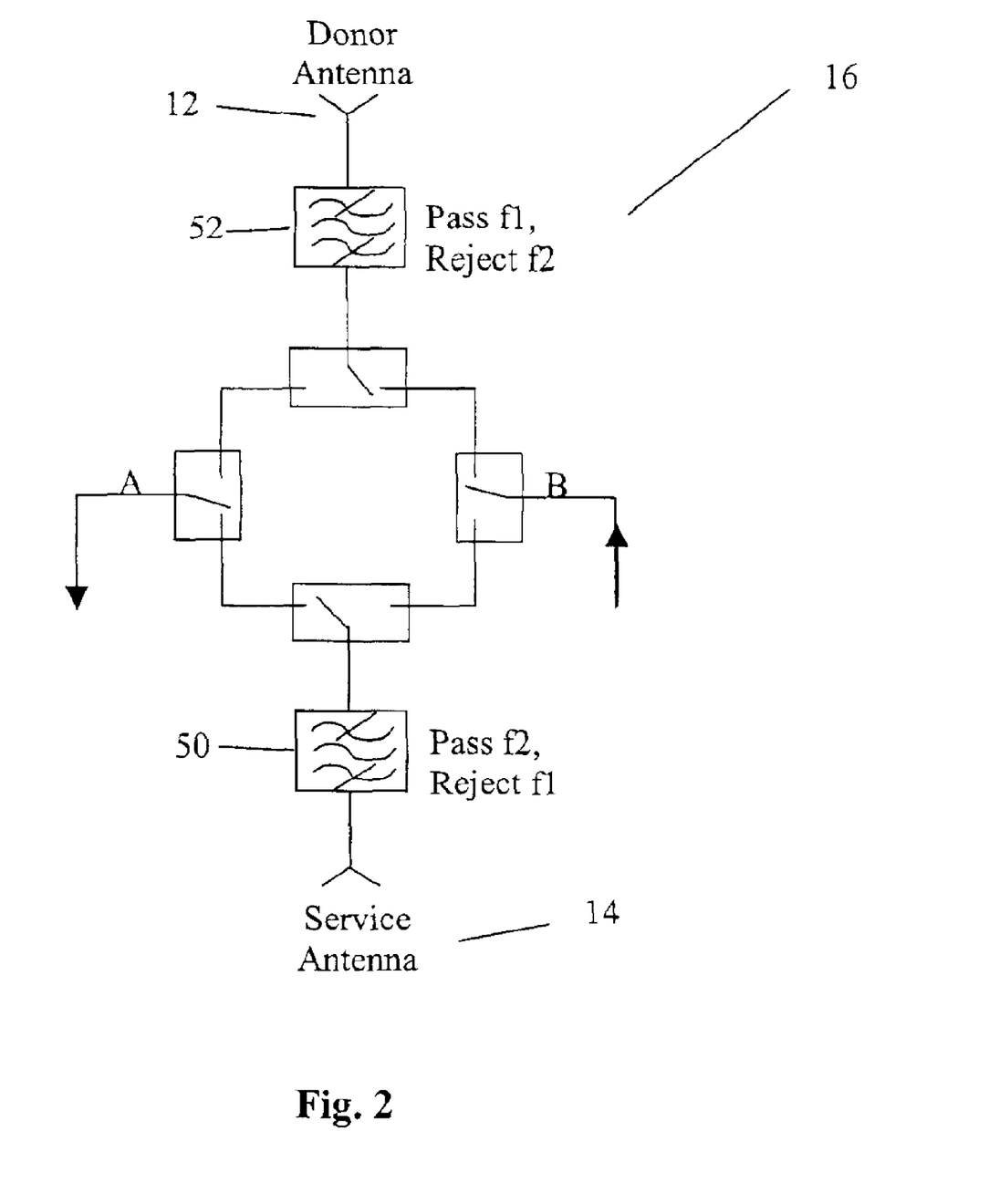
FIG. 2 illustrates a variation of the enhancer of FIG. 1 incorporating band pass filters in the switch matrix thereof according to one example of the present disclosure.

This concept of separating the frequency bands to isolate signals feeding into the donor and service antennas can be further improved by incorporating filters with the switch matrix 16. FIG. 2 is the switch matrix integrated with two band pass filters according to another example of the present disclosure. For example, a first band pass filter 50 can be implemented with the service antenna 14 so that signals on f1 can pass while signals on f2 are to be rejected. Similarly, a second band pass filter 52 can be added to screen the signals before they reach the donor antenna 12 so that f2 signals will pass but f1 signals will be blocked. Therefore, during a forward link communication, there are few f2 signals feeding back into the donor antenna 12, while on the reverse link, there are few f1 signals feeding back into the service antenna 14.

Another benefit of using different frequencies at the donor and service antenna is that, as mentioned above, the enhancer can scan the available operating spectrum and determine which frequency band corresponds to a minimum interference, and then use that particular frequency for the link between the enhancer and the terminals/BTSs to ensure signal quality and to reduce interference.

Referring back to FIG. 1, in order to select appropriate frequencies for the mixers 34 and 42, and after f2 is determined, LO1 and LO2 are given as follows in one example of the present disclosure:

$LO1 = f1 - IF;$ $LO2 = f2 - IF$ and the assignment of LO1 and LO2 to the mixer 34 and mixer 42 has to ensure that for either the forward link or reverse link communications, the two mixers are using different LOs. Table 2 below illustrates such a mutual exclusivity in assigning the LOs.

TABLE 2

| LO1 and LO2 selection table | | |
|---|---|---|
| | Forward link | Reverse link |
| Mixer1 | LO2 | LO1 |
| Mixer2 | LO1 | LO2 |

Figure 3:
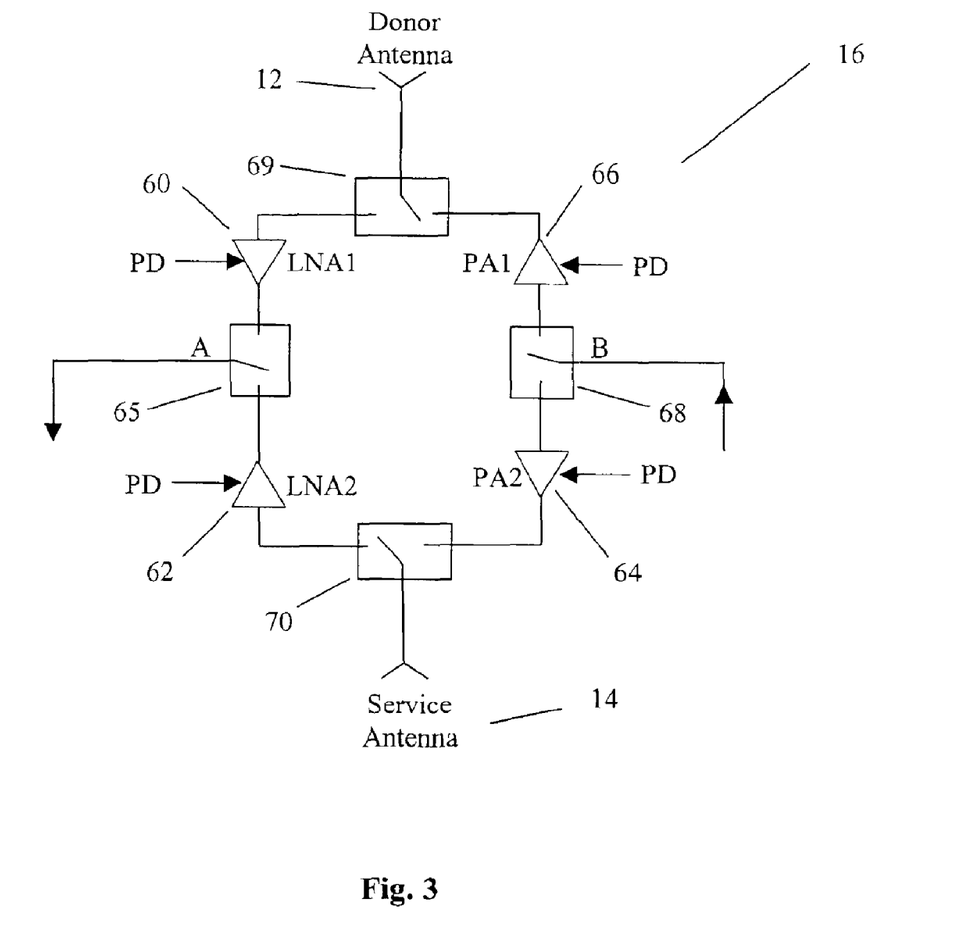
FIG. 3 illustrates another variation of the enhancer of FIG. 1 incorporating controlled amplifications in the switch matrix thereof according to one example of the present disclosure.

Referring to FIG. 3 where controlled amplifications are added in the switch matrix to reduce the coupling between antennas through the switch matrix itself. Low noise amplifiers 60 and 62 are added in the receiver paths from antennas to port A (switch 65), and power amplifiers 64 and 66 are added in the transmitter paths from port B (switch 68) to antennas. The gains of the amplifiers are controlled by the base band module through, for instance, their power down pins (PD). During the forward link period, LNA1 60 and PA2 64 will be activated while LNA2 62 and PA1 66 will be de-activated (powered down). So, any leakage from switch 68 will be further attenuated by the de-activated PA1 66, while any leakage from switch 70 will be further attenuated by the de-activated LNA2 62. Similarly, during the reverse link period, LNA2 62 and PA1 66 will be activated while LNA1 60 and PA2 64 will be de-activated (powered down). So, any leakage from switch 68 will be further attenuated by the de-activated PA2 64, while any leakage from switch 69 will be further attenuated by the de-activated LNA1 60. The improvement for the isolation of the switch matrix is equal to the gain difference between the active and de-active amplifiers.

Figure 4:
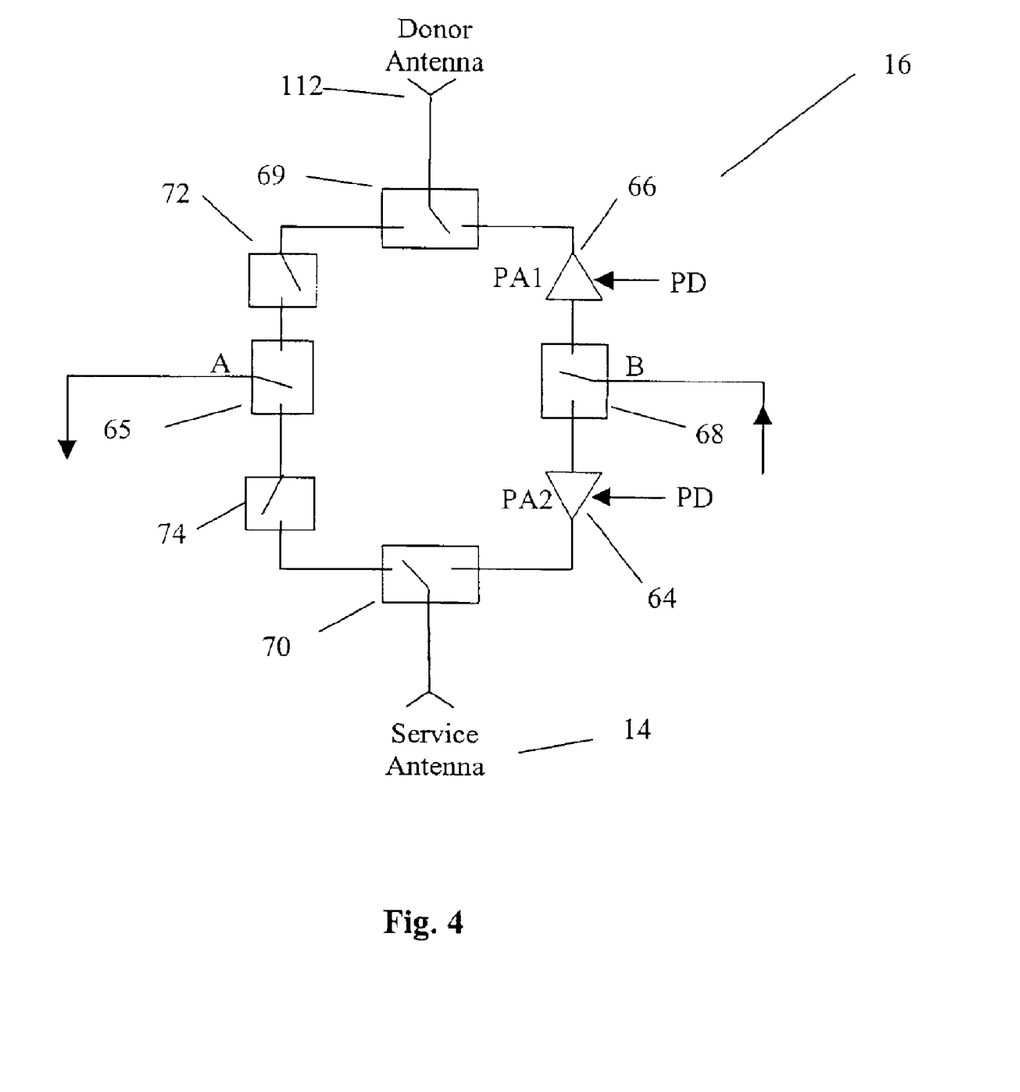
FIG. 4 illustrates another variation of the enhancer of FIG. 1 incorporating controlled amplifications and additional switches in the switch matrix thereof according to one example of the present disclosure.

Referring to FIG. 4 where the LNA1 60 and LNA2 62 of FIG. 3 are replaced by controlled switch 72 and switch 74. During the forward link period, switch 72 will be on and PA2 64 will be activated while switch 74 is off and PA1 66 will be de-activated (powered down). So, any leakage from switch 68 will be further attenuated by the de-activated PA1 66, while any leakage from switch 70 will be further attenuated by the turned-off switch 74. Similarly, during the reverse link period, switch 74 is turned on and PA1 66 will be activated while switch 72 is turned off and PA2 64 will be de-activated (powered down). Any leakage from switch 68 will be further attenuated by the de-activated PA2 64, while any leakage from switch 69 will be further attenuated by the turned-off switch 72. The improvement for the isolation of the switch matrix is equal to the gain difference between active amplifier PA and turned-off switch.

Figure 5:
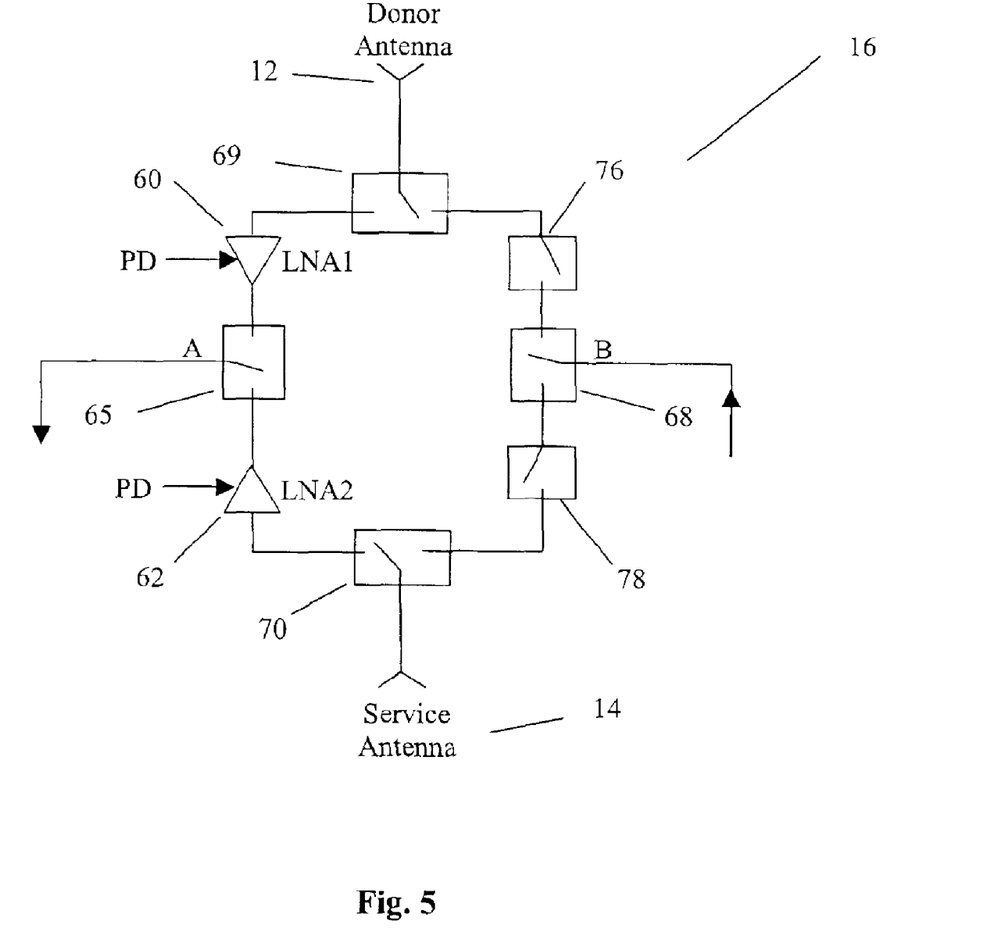
FIG. 5 illustrates another variation of the enhancer of FIG. 1 incorporating controlled amplifications and additional switches in the switch matrix thereof according to another example of the present disclosure.

Referring to FIG. 5, PA1 64 and PA2 66 in FIG. 3 can be replaced with controlled switch 76 and switch 78. The isolation of the switch matrix is then improved by the gain difference between the active amplifier LNA and the turned-off switch.

Figure 6:
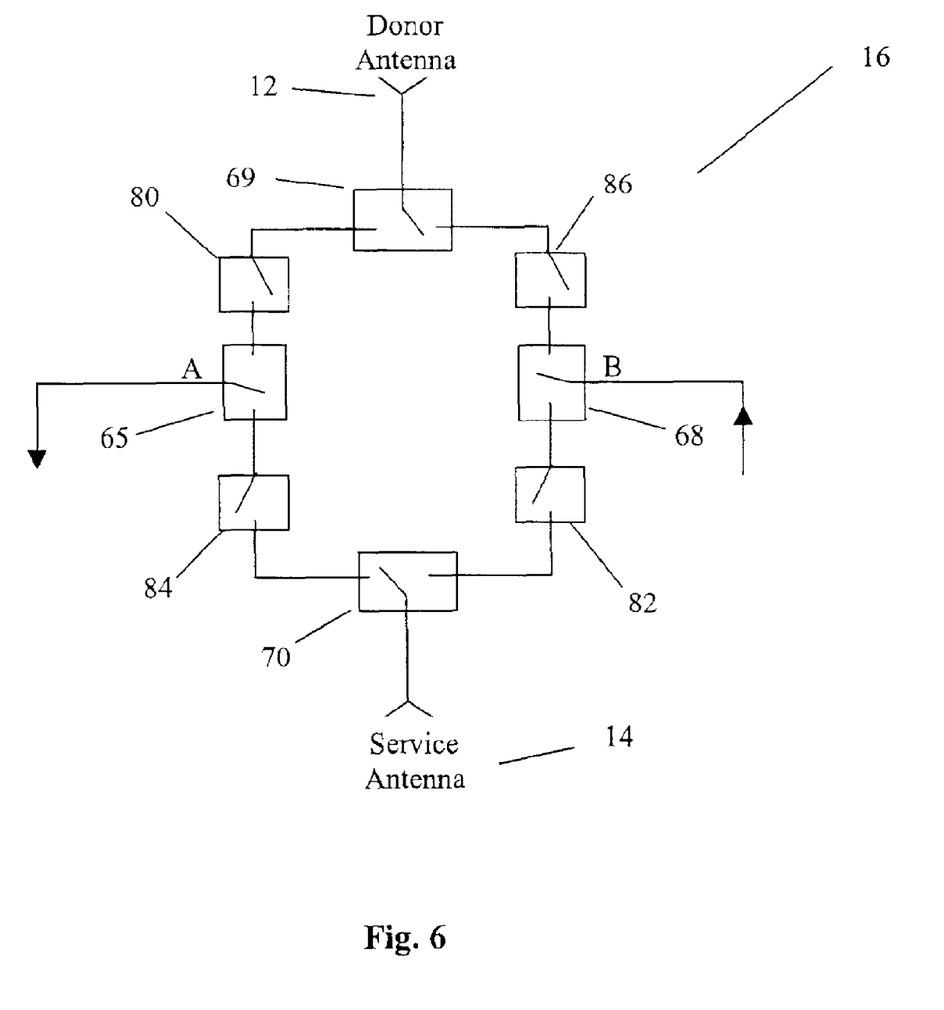
FIG. 6 illustrates another variation of the enhancer of FIG. 1 incorporating additional controlled switches in the switch matrix thereof according to one example of the present disclosure

Referring to FIG. 6, another embodiment of FIG. 3 is to replace all amplifiers with controlled switches. During the forward link period, switch 80 and switch 82 will be on while switch 84 and switch 86 will be off. During the reverse link period, switch 84 and switch 86 are turned on while switch 80 and switch 82 are turned off. The isolation of the switch matrix is thus improved by using the additional controlled switches.

Appropriate physical design and construction of the donor antenna and service antenna can also maximize antenna isolation, thereby improving the reception to both the BTS and terminals.

Figure 7:
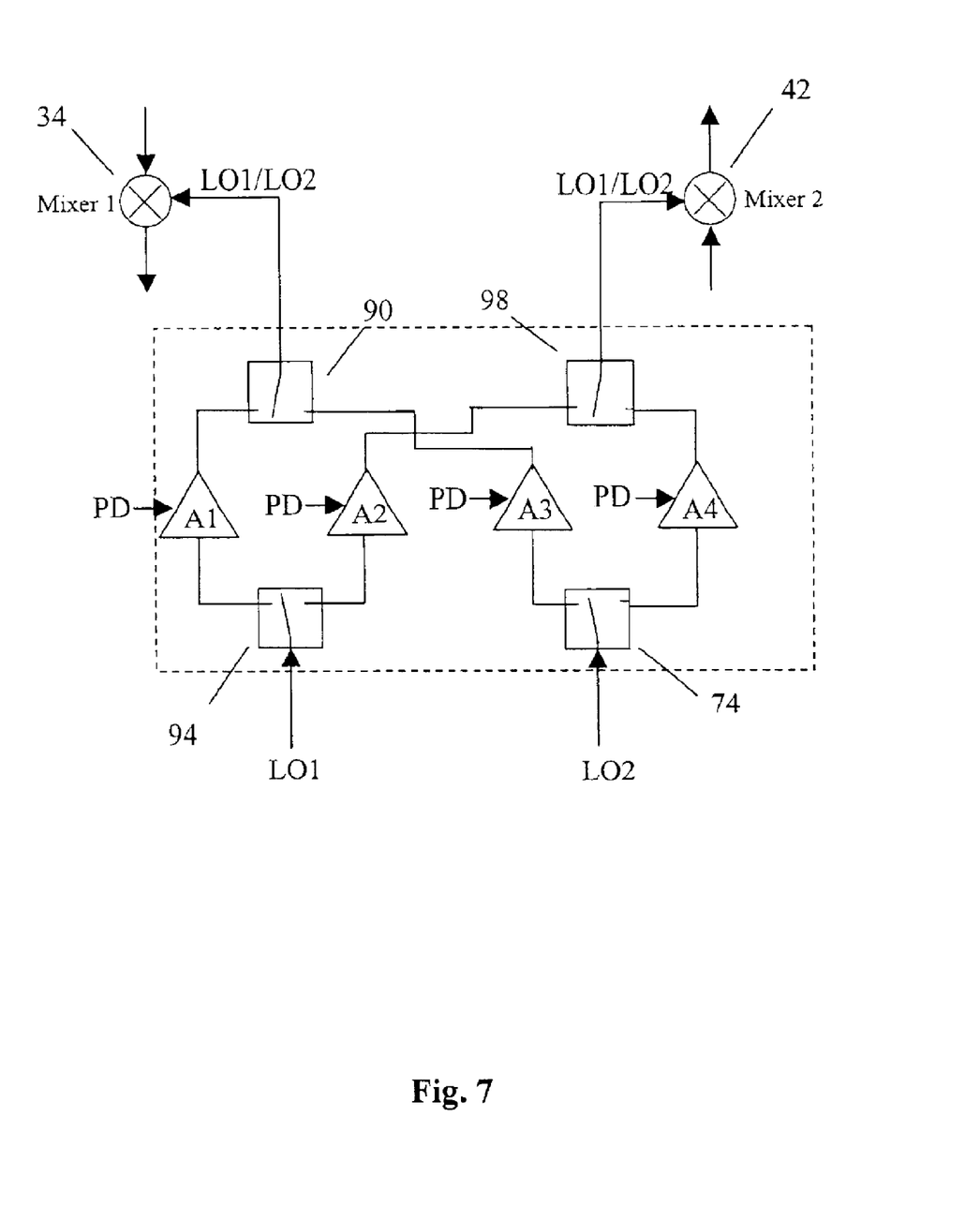
FIG. 7 illustrates a physical layout design of a donor antenna and service antenna according to one example of the present disclosure.

The local oscillator frequencies for mixer1 and mixer2 can be selected differently for forward and reverse links as indicated in Table 2. FIG. 7 illustrates a mechanism for feeding appropriate locally generated frequencies to the mixers through a switch matrix 90 with controlled gain amplifiers. The switch matrix 90 has four switches 92, 94, 96 and 98, and four amplifiers A1 through A4. During the forward link, the switch matrix 90 is configured that LO2 and connected to mixer1 34 and LO1 is connected to mixer2 42. The amplifiers A2 and A3 are activated while amplifiers A1 and A4 are de-activated (powered down). During the reverse link, the switch matrix is configured that LO1 and connected to mixer1 34 and LO2 is connected to mixer2 42. The amplifiers A1 and A4 are activated while amplifiers A2 and A3 are de-activated (powered down). As such, the LO in the desired switch paths are amplified by the active amplifiers and the leakages in un-desired switch path are attenuated by the de-activated amplifiers. The isolation between LO1 and LO2 is improved by the same amount as the gain difference between active and de-active amplifiers.

Figure 8:
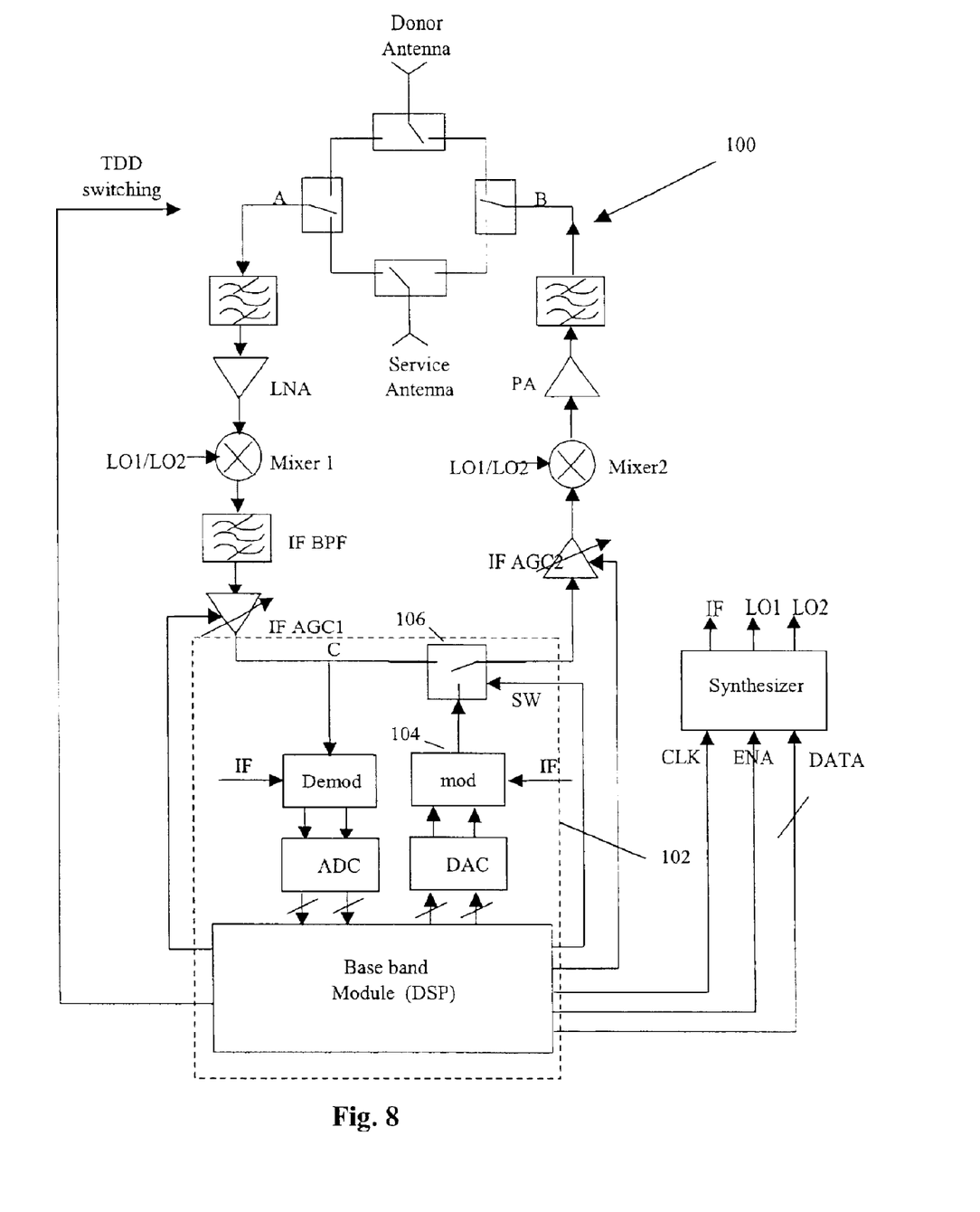
FIG. 8 illustrates a mechanism for assigning two locally generated frequencies for two mixers of the enhancer of FIG. 1 according to one example of the present disclosure.

FIG. 8 illustrates an enhancer 100 implemented with an improved modulator sub-system 102 according to another example of the present disclosure. This enhancer 100 is almost the same as the enhancer 10 (FIG. 1) except for an expanded modulator sub-system 102. The expanded modulator sub-system 102 is similar to the modulator sub-system 21 of FIG. 1 except it has added several additional components to be integrated into the enhancer 100 for injecting information from the enhancer into the signal path and further sending same out to the BTs and terminals. The additional components of the expanded modulator sub-system 102 includes a modulator 104 and a switch 106 between the receiver and transmitter subsystems, and a digital-to-analog converter 108. In summary, whenever the enhancer 100 needs to send information to the BTS or terminals, the switch 106 connects the modulator to the transmitter sub-system. As such, the information generated in the based band module 26 will be sent out from the modulator 104 to the transmitter sub-system. The information that the enhancer sends out can be any of the following: the forward or reverse signal quality indication, interference level, hardware status or alarm, power down or frequency change request, or acknowledge to messages that are sent from BTS or terminals to the enhancer.

Figure 9:
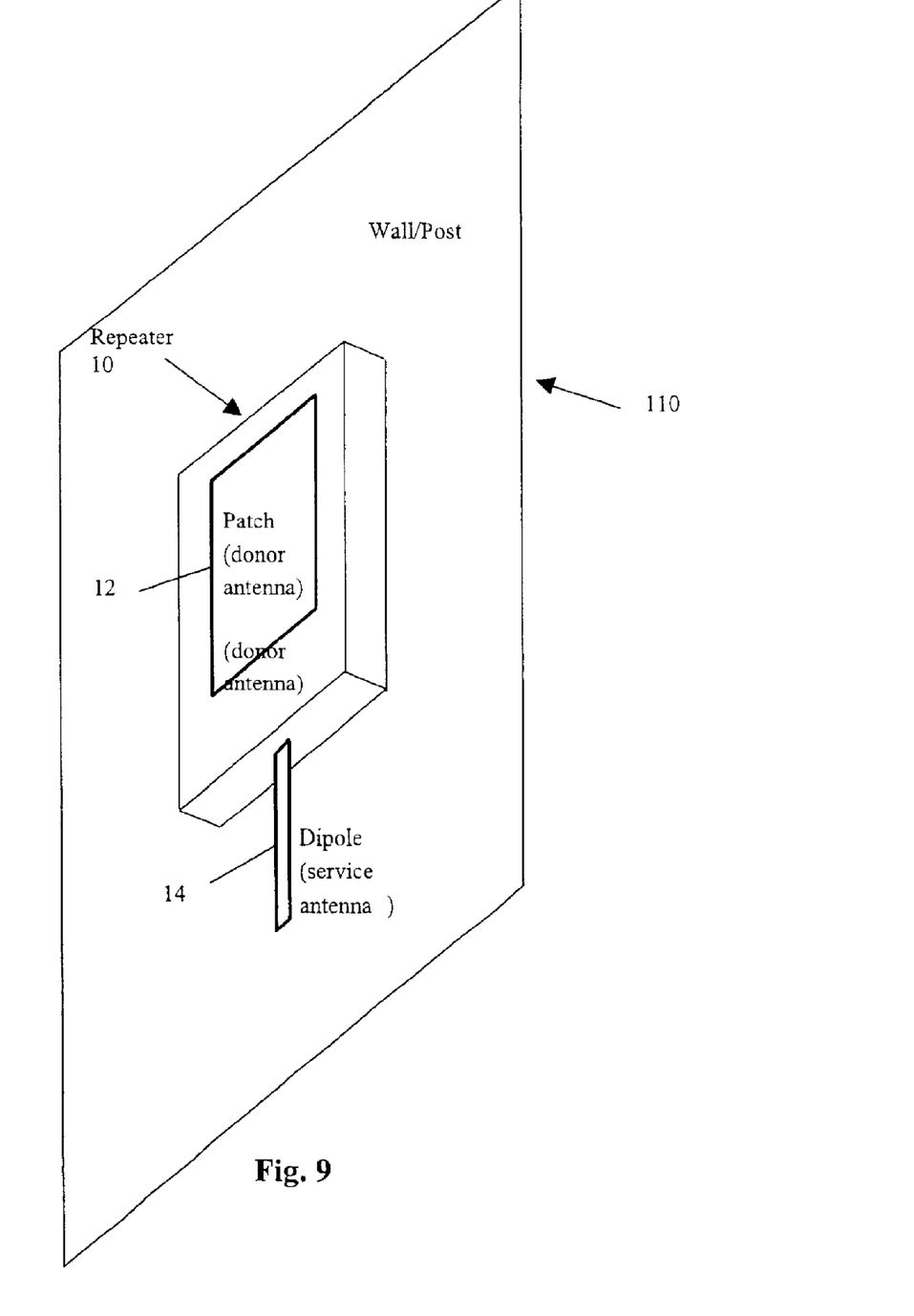
FIG. 9 illustrates a enhancer implemented with a modulator subsystem according to another example of the present disclosure.

FIG. 9 illustrates a design of the donor antenna and service antenna according to one example of the present disclosure. Assuming the enhancer 10 is hanging on a wall or post 110, the donor antenna 12 is designed to be a patch antenna facing the BTS direction, while the service antenna 14 can be a dipole antenna lying on the same plane as the patch antenna. Both the patch and dipole antennas have a null point in their radiation patterns along the vertical direction so that such an arrangement as shown in FIG. 3 will maximize their mutual isolation.

The above disclosure provides several different embodiments, or examples, for implementing different features of the disclosure. Also, specific examples of components, and processes are described to help clarify the disclosure. These are, of course, merely examples and are not intended to limit the disclosure from that described in the claims.

While the disclosure has been particularly shown and described with reference to the preferred embodiment thereof, it will be understood by those skilled in the art that various changes in form and detail may be made therein without departing from the spirit and scope of the disclosure.

What is claimed is:

1. A wireless enhancer comprising
    a first antenna for receiving an incoming signal;
    a receiver sub-system that amplifies and converts the incoming signal from the first antenna to a first predetermined frequency band;
    a demodulator coupled to the receiver sub-system for demodulating the converted signal, and detecting timing information thereof;
    a transmitter sub-system operable with the receiver sub-system that converts the signal from the receiver sub-system to a second predetermined frequency band and amplifies the signal;
    a second antenna for further transmitting the amplified signal from the transmitter subsystem; and
    a switch matrix that controls connection switching among the first antenna, the second antenna, the transmitter sub-system, and the receiver sub-system,
    wherein the connection switching of the switch matrix is made based on the timing information detected by the demodulator and based on whether the incoming signal comes from a terminal or a base transceiver station (BTS) of a wireless communication network,
    wherein the switch matrix is a transfer switch with four ports, the first port being connectable to the receiver sub-system, the second port being connectable to the transmitter sub-system, the third port being connectable to the first antenna, the fourth port being connectable to the second antenna wherein the first antenna and second antenna each operating with a radio frequency (RF) filter, the two RF filters having non-overlapping pass bands for improving isolation between the transmitter sub-system and receiver sub-system.

2. The enhancer of claim 1 the first antenna further comprises a directional antenna pointing to at least one component of the receiver sub-system.

3. The enhancer of claim 1 further comprising a radio frequency (RF) filter operable with the first antenna and having its bandwidth narrower than the operating bandwidth of the receiver sub-system.

4. The enhancer of claim 1 wherein the second antenna further comprises an omni-directional antenna.

5. The enhancer of claim 1 wherein the first antenna and the second antenna are placed in such a way to have their respective null points along a predetermined direction so as to maintain the maximum radio frequency isolation.

6. The enhancer of claim 5 wherein the first antenna is a patch antenna arranged to face the BTS.

7. The enhancer of claim 6 wherein the second antenna is a dipole antenna arranged to lie on the same plane as the patch antenna.

8. The enhancer of claim 1 further comprising a radio frequency (RF) filter operable with the second antenna and having its bandwidth narrower than the operating bandwidth of the transmitter sub-system.

9. The enhancer of claim 1 wherein the switch matrix further includes four independent single throw double port switches and are controlled to perform two switching functions, the first of which connecting the receiver sub-system and the first antenna and connecting the transmitter sub-system and the second antenna while keeping the receiver sub-system unconnected from the second antenna and the transmitter sub-system unconnected from the first antenna, the second of which connecting the transmitter sub-system and the first antenna and connecting the receiver sub-system and the second antenna while keeping the transmitter sub-system and the second antenna unconnected, and the receiver sub-system and the first antenna unconnected.

10. The enhancer of claim 1 wherein the switch matrix further comprises four controlled amplifiers, each placed between two double port switches to attenuate signal leakage from the double port switches.

11. The switch matrix of claim 10 wherein at least one of the controlled amplifiers is replaceable by a double pole single throw switch.

12. The enhancer of claim 1 wherein the first predetermined frequency band is an intermediate frequency band lower than the signal received from the donor antenna.

13. The enhancer of claim 1 wherein the receiver sub-system comprises a radio frequency (RF) filter, a low noise amplifier, and a down converter, a band pass filter, and an adjustable gain amplifier.

14. The enhancer of claim 13 wherein the adjustable gain amplifier adjusts the gain to a level such that the signal level at the input of the demodulator falls into an operating range of the demodulator and an analog-to-digital converter connected therewith.

15. The enhancer of claim 1 wherein the demodulator is operable with a digital base band module to generate switch timing information.

16. The enhancer of claim 1 wherein the transmitter sub-system further comprises an adjustable gain amplifier, an up-converter that converts signals of the second predetermined frequency into a radio transmission frequency, and a power amplifier.

17. The enhancer of claim 16 wherein the adjustable gain amplifier adjusts its gain based on the signal level at the input of the demodulator, radio frequency leakage between the transmitter sub-system and receiver sub-system, and the maximum power output of the transmitter sub-system.

18. The enhancer of claim 17 wherein the adjustable gain amplifiers adjusts its gain based on the signal from the receiver sub-system, an operating ranges of the demodulator and an analog-to-digital converter connected therewith, a radio frequency leakage between the transmitter sub-system and receiver sub-system, and the maximum power output of the transmitter sub-system.

19. The enhancer of claim 1 further comprising a synthesizer that generates one or more local frequencies for the transmitter subsystem and receiver sub-system for their signal conversions.

20. The enhancer of claim 19 wherein the synthesizer further comprises a four port switch matrix with four switchable amplifiers to isolate each generated local frequency.

21. The enhancer of claim 1 wherein the switch matrix is further enhanced by at least one low noise amplifier connected between the first and second antennas for reducing signal coupling therebetween.

22. The enhancer of claim 1 wherein the switch matrix is further enhanced by at least one controllable switch connected between the first and second antennas for reducing signal coupling therebetween.

23. The enhancer of claim 1 wherein the switch matrix is further enhanced by at least one controllable low noise amplifier connected between the first and second antennas for reducing signal coupling therebetween.

24. A method for enhancing a wireless radio signal between a wireless terminal and a base transceiver station (BTS) comprising:
receiving an incoming signal from a first antenna;
connecting the first antenna to a receiver sub-system;
scanning a predetermined frequency band of an operating spectrum of the receiver sub-system to determine a carrier frequency band of the incoming signal;
adjusting a first carrier frequency for the first antenna based on the determined carrier frequency and at least one additional predetermined criterion;
amplifying and converting, by the receiver sub-system, the incoming signal from the first antenna to a first predetermined frequency band;
demodulating the converted signal, and detecting timing information thereof;
converting, by a transmitter sub-system operable with the receiver sub-system, the signal from the receiver sub-system to a second predetermined frequency band and further amplifying the signal;
connecting the transmitter sub-system to a second antenna;
and transmitting through the second antenna the amplified signal from the transmitter sub-system,
wherein a switch matrix is used to control connection switching among the first antenna, the second antenna, the transmitter sub-system, and the receiver sub-system and wherein the connections are made based on the timing information detected by the demodulator and based on whether the incoming signal comes from the terminal or the BTS.

25. The method of claim 24 wherein the first antenna is for receiving signals from the BTS and transmitting signals to the terminal and the second antenna is for receiving signals from the terminal and transmitting signals to the BTS.

26. The method of claim 24 further comprising generating a switch control signal based on the signal received and processed by the receiver sub-system and the detected timing information.

27. The method of claim 26 wherein generating the control signal further comprises:
synchronizing to the incoming signal received at the receiver sub-system to align a demodulation timing thereof;
demodulating the signal from the receiver sub-system;
determining a ratio of reverse link and forward link communication from the demodulated signal;
generating a switching timing signal that properly indicates switching needs between an reverse link and forward link communications based on a Time Divisional Duplex technology.

28. The method of claim 24 wherein the predetermined criterion includes a threshold measurement indicating the strength of the demodulated signal.

29. The method of claim 24 wherein the predetermined criterion further includes a threshold measurement indicating a signal-to-noise ratio of the demodulated signal.

30. The method of claim 24 wherein the predetermined criterion further includes a threshold measurement indicating the least traffic loading in the determined carrier frequency.

31. The method of claim 24 further comprising repeating the steps of determining and adjusting if the at least one additional predetermined criterion is not satisfied while using the first carrier frequency.

32. The method of claim 24 wherein transmitting further comprises:
sweeping a predetermined carrier frequency band of the operating spectrum of the transmitter sub-system to determining a second carrier frequency based on the noise level of the predetermined carrier frequency band; and
adjusting the carrier frequency of the second antenna to be the determined second frequency.

33. The method of claim 32 wherein sweeping further comprises determining the second carrier frequency based on its separation from the first carrier frequency.

34. A wireless time division duplex (TDD) enhancer comprising:
   a directional donor antenna that communicates with a base transceiver station (BTS) at a first carrier frequency;
   a service antenna that communicates with a plurality of terminals at a second carrier frequency;
   a receiver sub-system that comprises a low-noise amplifier, a down-converter, and an intermediate frequency filter, an intermediate frequency amplifier;
   a demodulator coupled to the output of the receiver sub-system determines reverse link and forward link time slots based on a forward link signal sent from the base transceiver station;
   a transmitter sub-system coupled to the output of the receiver sub-system comprises an adjustable gain amplifier, an up-converter, and a power amplifier;
   a synthesizer that generates at least two local frequencies for use by the receiver sub-system and the transmitter sub-system;
   a switch matrix selectively coupling the donor antenna, the service antenna, the transmitter sub-system, and the receiver sub-system; and
   a donor radio frequency band pass filter coupled between the donor antenna and the switch matrix;
   wherein during the forward link time slots, the switch matrix connects the donor antenna to the receiver sub-system to receive incoming signals at the first carrier frequency and connects the service antenna to the transmitter sub-system to transmit outgoing signals at the second carrier frequency; and
   wherein during the reverse link time slot, the switch matrix connects the service antenna to the receiver sub-system and the donor antenna to the transmitter sub-system for receiving incoming at the second frequency and transmitting outgoing signals at the first frequency respectively.

35. The TDD enhancer of claim 34 further comprising a service radio frequency band pass filter coupled between the service antenna and the switch matrix, wherein the donor and service radio frequency band pass filters do not have an overlapping pass-band.

36. The wireless TDD enhancer of claim 34 further comprising means for selecting the first carrier frequency during the forward link time slots.

37. The wireless TDD enhancer of claim 36 further comprising means for:
   connecting the donor antenna to the receiver sub-system;
   disabling the transmitter sub-system;
   scanning the operating spectrum of the BTS to receive a forward link signal from the BTS;
   demodulating and detecting the forward link signal; and
   selecting the first carrier frequency for the donor antenna to further receive the forward link signals from the BTS.

38. The wireless TDD enhancer of claim 37 wherein means for selecting the first carrier frequency further comprises selecting the first carrier frequency with the maximum broadcast signal strength.

39. The wireless TDD enhancer of claim 37 wherein means for selecting the first carrier frequency further comprises selecting the first carrier frequency with the best signal quality.

40. The wireless TDD enhancer of claim 34 further comprising means for selecting the second carrier frequency during the reverse link time.

41. The wireless TDD enhancer of claim 40 wherein the means for selecting further comprises means for:
   connecting the service antenna to the receiver sub-system;
   disabling the transmitter sub-system; and
   sweeping the operating spectrum of the terminal to select the second carrier frequency based on the noise level thereof during the reverse link lime.

42. The TDD enhancer of claim 34 wherein the synthesizer further comprises a four port switch matrix with four switchable amplifiers to isolate each generated local frequency.

43. The TDD enhancer of claim 34 wherein the switch matrix is further enhanced by at least one low noise amplifier connected between the donor and service antennas for reducing signal coupling therebetween.

44. The TDD enhancer of claim 34 wherein the switch matrix is further enhanced by at least one controllable switch connected between the donor and service antennas for reducing signal coupling therebetween.

45. The TDD enhancer of claim 34 wherein the switch matrix is further enhanced by at least one controllable low noise amplifier connected between the donor and service antennas for reducing signal coupling therebetween.

* * * * *